Patented Feb. 9, 1943

2,310,449

UNITED STATES PATENT OFFICE 2,310,449

AGE RESISTING RUBBERY MATERIAL AND METHOD OF MAKING

Irving E. Lightbown and John G. McNab, Roselle, N. J., assignors, by mesne assignments, to Jasco, Incorporated, a corporation of Louisiana No Drawing. Application August 12, 1939, Serial No. 289,788

20 Claims. (Cl. 260—93)

The present invention relates to a process for the manufacture of rubber and products of a similar nature. More particularly, the invention is directed to an improved process for manufacturing rubber or rubber-like materials wherein there is incorporated into the stock a compound of the type hereinafter disclosed, whereby antioxidant or age-resisting properties are developed in the finished product. The invention will be understood from the following description and examples wherein the preferred mode of operating the invention is fully set forth and described.

It is well known that rubber deteriorates more or less rapidly when exposed to air, heat and sunlight, and that such deterioration is characterized by a loss in the tensile strength, resiliency and other desirable properties of the material and by an increase in the tendency to crack on flexing. Many age resistors or antioxidants have been proposed for incorporating into the rubber stock which are more or less effective. These compounds are usually secondary aromatic amines or condensation products of amines with ketones. It has been found, however, that many of these amines are objectionable when used in the manufacture of a white stock, as they have a tendency to produce discoloration of the stock, especially on exposure of the product to sunlight. These substances also tend to discolor a lacquered surface when rubber in which they are incorporated is placed against it. An object of the present invention will be to provide an antioxidant which is particularly effective for imparting age resisting properties to rubber or vulcanizable rubber-like materials. A further object will be to provide an antioxidant which may be used with white stocks without danger of discoloring the stock either before or after exposure to light, and which will not discolor white or light colored enameled or lacquered surfaces in contact with rubber stocks containing the same. Other objects of this invention will be apparent from the following description and the claims.

The new class of antioxidant or age-resisting materials, which have been found upon incorporation into rubber and synthetic rubber stocks and like products of similar nature to impart excellent age-resisting qualities to the finished product, include metallic salts of unsubstituted or substituted alcohols, mercaptans, phenols, thiophenols and particularly the sulfides of phenols and thiophenols, or similar compounds, which are represented generically by the formula—

$$MZRR' \qquad (1)$$

In the formula M represents a metal of groups II to VI of the periodic table, such as aluminum, barium, calcium, chromium, magnesium, lead, tin, zinc, cadmium and the like; Z represents a negative element of group VI of the periodic table, such as oxygen, sulfur, selenium or tellurium; R represents an organic radical, such as a straight or branched chain aliphatic or cycloaliphatic or aromatic radical, which may contain one or more benzene rings or a condensed ring system, such as naphthalene and the like, and such radical may also have substituent groups, such as alkyl, aryl, aralkyl, alkyl-aryl, hydroxy, carboxy, alkoxy, aroxy, mercapto or the like; and R' represents hydrogen or a group of the type —$Z_xR$, where Z and R have the same meaning as above, and $x$ is an integer, preferably one to four. There may be a plurality of groups MZ, likewise a plurality of groups R', attached to the radical R.

Other valences of the metal M than that connected to the oxygen, sulfur or the like in the above formula may be joined to other inorganic or organic atoms or groups, such as sulfur, oxygen, alkyl and aryl groups, residues of alcohols, phenolic compounds, mercaptans and organic and inorganic acids, also groups of the type —OR'' and —SR'', and the like, in which R'' represents an organic or inorganic group or radical. It is preferred, however, to employ compounds in which all valences of the metal are connected to similar groups of the type shown in the Formula 1.

Although in the above general formula Z may represent either oxygen or a member of the sulfur family, it has been found in the case of aliphatic compounds that the metallic derivatives of the mercaptans or similar compounds containing other members of the sulfur family are more suitable for use as antioxidants for rubber-like products.

The compounds whose metal salts are particularly preferred as antioxidants in accordance with the present invention include the following classes, although the invention is not limited to such classes:

Mercaptans—

  (2)

Phenols—

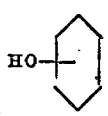  (3)

Thiophenols—

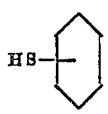  (4)

Alkyl thiophenols—

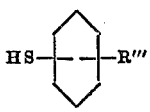  (5)

Alkyl phenol thioethers—

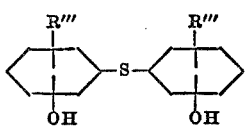  (6)

Alkyl phenol disulfides—

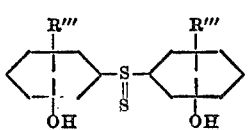  (7)

and

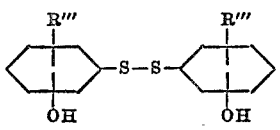  (8)

Polymers of alkyl phenol sulfides—

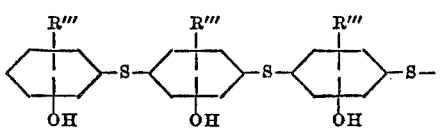  (9)

and

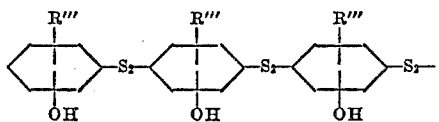  (10)

Alkyl hydroxy thianthrenes—

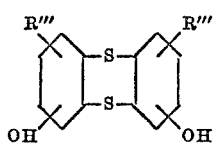  (11)

While the above compounds are preferably symmetrical, the substituent groups may be different on the various hydrocarbon nuclei of the same molecule, and/or may be differently placed, and one or more of the hydrocarbon nuclei may contain other substituent groups. All such substituent groups may be attached at any position on the hydrocarbon chain or ring, and may have any position relative to one another.

In all the above Formulae 2 to 11, R''' represents an alkyl group containing preferably about four to eight carbon atoms.

An especially preferred class of compounds, which have been found particularly effective for the purposes of this invention, are the phenol sulfides, including polysulfides as well as monosulfides, and related compounds, represented by the following general formula—

$$MOArZ_xR \quad (12)$$

in which Ar represents an aromatic nucleus, which may contain one or more benzene rings or a condensed ring system, such as naphthalene and the like; and M, Z, R and $x$ have the same meaning as in Formula 1 above. The nucleus may have attached thereto any of the substituent groups described in connection with the radical R of Formula 1.

This invention relates to metal derivatives of all of the types of compounds described above, in which the hydrogen of one or more of the hydroxyl, mercapto or like groups is replaced by a suitable metal of the class described. The metal may be connected to two hydroxyl or similar groups of the same molecule or it may join two different molecules, which may be similar or different, at least one of the molecules being an alcohol, mercaptan, phenol, or thiophenol, the latter two including sulfides of a phenol or thiophenol. Illustrative salts are represented by the following formulae:

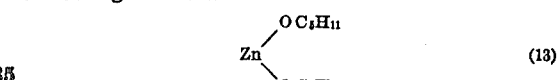  (13)

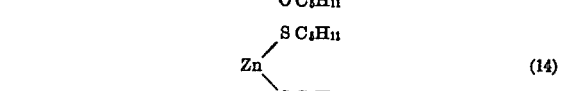  (14)

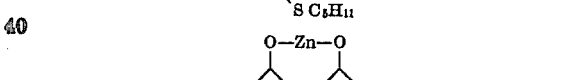

  (15)

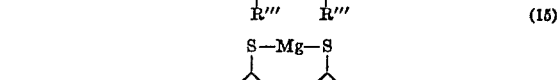

  (16)

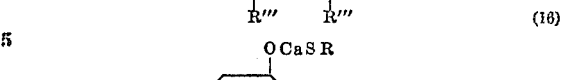  (17)

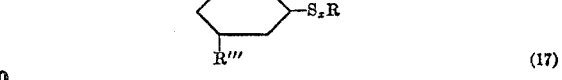

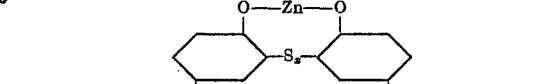  (18)

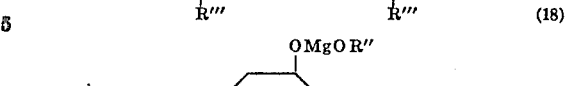

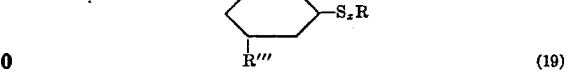  (19)

In the above formulae R and R'' have the same meanings as in Formula 1, R''' has the same meaning as in Formulae 2 to 11, and $x$ is an integer, one to four.

The sulfides containing zinc or magnesium are easily prepared and are especially suitable for the purposes of this invention. The zinc salt of the thioether of tertiary amyl phenol, for example, is readily prepared according to the method described below, and is believed to have the formula—

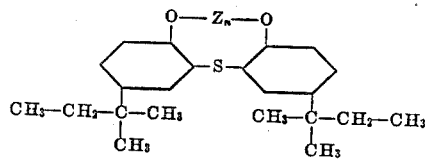

Illustrative compounds and suitable methods for their preparation are as follows:

*Example 1*

1 mol of tertiary amyl phenol thioether (prepared by the method described in the French Patent 824,600) is dissolved in about 1½ times its volume of absolute ethyl alcohol. This solution is then added to a solution of sodium ethoxide, prepared by dissolving 2 mols of metallic sodium in an excess of absolute ethyl alcohol. The sodium salt of the phenol, described as the thioether of tertiary amyl sodium phenolate, is thereby formed and remains in solution in the excess ethyl alcohol.

*Example 2*

A slight excess over the calculated amount of the anhydrous halide (chloride or bromide) of the desired metal, such as zinc chloride, is dissolved in absolute ethyl alcohol, and the resulting solution is added with stirring to the alcoholic solution of the thioether of tertiary amyl sodium phenolate described in the preceding example. The thioether of tertiary amyl zinc phenolate (zinc salt of diamyl dihydroxy diphenyl sulfide) is thus formed, along with sodium chloride, which is insoluble in the absolute alcohol and precipitates therefrom. The mixture is then filtered to remove the precipitated sodium chloride, and the alcohol removed by evaporation of the filtrate, the last stage of the evaporation being conducted under vacuum. If it is found that the sodium chloride is not completely removed, due to the presence of traces of water or other reason, the product may be further treated to remove the sodium chloride by any suitable means. For example, the dry product may be dissolved in petroleum naphtha in the absence of water. The sodium chloride remains undissolved and is separated from the naphtha solution by filtration.

The above procedure may also be used in preparing corresponding thioether phenol salts of magnesium, calcium and barium. The chlorides of the metals are satisfactory in all cases except with barium, in which case it is preferable to use the bromide in order to secure sufficient solubility of the barium halide in absolute alcohol.

In some cases it will be found that some of the metal salt of the phenol thioether precipitates along with the sodium chloride. It may be recovered by extracting the dried precipitate with naphtha. The desired product is then obtained in concentrated form by evaporation of the naphtha.

Absolute methyl alcohol may also be used as solvent in place of the ethyl alcohol in the processes described above.

*Example 3*

In about 1200 parts by weight of 98% isopropyl alcohol is dissolved 358 parts by weight (one molecular proportion) of tertiary amyl phenol thioether. To this solution is added 80 parts by weight (two molecular proportions) of flaked sodium hydroxide. The mixture is warmed and agitated until all of the sodium hydroxide is used up to give a solution of the thioether of tertiary amyl sodium phenolate. To this solution is added an isopropyl alcohol solution of the desired metal halide. In this case, hydrated metal halides may be used as well as anhydrous products. In general, a portion of the heavy metal derivatives of the tertiary amyl phenol thioether separates from the isopropyl alcohol-water solution. The product is filtered and the filter cakes are dried. The filtrate is evaporated, and the residue combined with the dried filter cakes. The total product is then dissolved in petroleum naphtha and filtered to remove undissolved sodium chloride. The salt-free product is then recovered by the evaporation of the naphtha solution.

*Example 4*

Thioether phenolates of metals having sufficiently basic oxides, such as calcium and barium, may be prepared by a direct reaction of the phenol thioether and the oxide in the following manner: A mixture of 107 parts tertiary amyl phenol thioether, 214 parts of xylol, 10.8 parts of water, and 16.8 parts of hydrated calcium oxide is heated to boiling under a reflux condenser provided with a trap for removing water from the reflux condensate. The refluxing is continued until all the water (16.5 parts) has been removed. There is thus obtained a xylol solution of the thioether of tertiary amyl calcium phenolate (calcium salt of diamyl dihydroxy diphenyl sulfide). The excess calcium oxide (or hydroxide) is insoluble in the xylol and is removed by filtration. The calcium salt of the tertiary amyl phenol thioether is then obtained by evaporation of the xylol from the filtrate.

*Example 5*

Metallic magnesium may be converted into the alcoholate by stirring with an excess of absolute ethyl alcohol in the presence of mercury chloride and iodine as catalysts. A solution of tertiary amyl phenol thioether in absolute ethyl alcohol is then added to the resulting suspension of magnesium ethoxide. The mixture is refluxed for 24 hours and then filtered while hot to separate insoluble material. The filtrate is then evaporated to dryness and there is recovered as residue the thioether of tertiary amyl magnesium phenolate.

Corresponding metal salts of alkyl phenol disulfides and polysulfides and of the polymers, such as the dimers, trimers, and tetramers of the alkyl phenol thioethers, disulfides, and polysulfides, may also be prepared by substituting the respective alkyl phenol sulfide for the alkyl phenol thioethers used in the above examples. Metal salts of the corresponding selenides and tellurides may also be prepared by similar methods.

The crude products may also, if desired, be subjected to further purification in addition to, or in combination with or in place of the methods described above. Preparation of products of enhanced purity may be accomplished by fractional crystallization, by extraction or precipitation with selective solvents. Impurities may also be removed by treatment with suitable adsorptive agents, such as clay.

Various phenol sulfides, both unsubstituted and substituted, have been proposed as age-resisting agents for rubber. These substances are notably dark in color and cannot be used satisfactorily in the manufacture of a white rubber stock. Moreover, certain of these compounds under actual tests have been found to be comparatively ineffective as age resistors. It has been discovered, according to the present invention, that certain metallic salts of these compounds, described in detail above, are particularly effective in imparting age-resisting properties to vulcanized rubber products, and are light in color and may be used without danger of discoloring white stocks. The compounds of the present invention give best results when added in proportions varying from about 0.1% to about 5% of the weight of the rubber or similar compound present.

The age-resistant characteristics of a vulcanized rubber product can be readily ascertained by subjecting samples of the vulcanized product to an accelerated aging, wherein portions of the cured rubber product are subjected in a bomb to the action of oxygen under pressure and maintained for several hours at an elevated temperature. The treated samples are then examined and tested and the results compared with similar results obtained by testing the unaged vulcanized stock. The deterioration in properties suffered as a result of the oxidation treatment is indicative of the treatment normally expected for that particular stock during several years of natural aging depending on the duration of the test. Such a test is known as the Bierer-Davis aging test. Another test employed consists in heating the cured rubber stock in an oven, known as the Geer aging oven, under atmospheric pressure at about 70° C. for a week or more.

For the purpose of comparing a product of the present invention with phenyl beta naphthylamine (a commercial age resistor), a rubber stock of the following composition was made by mixing on an ordinary rubber mill:

| | Parts |
|---|---|
| Smoked sheet rubber | 100.0 |
| Zinc oxide | 5.0 |
| Sulfur | 3.0 |
| Stearic acid | 1.0 |
| Benzothiazyl disulfide | .5 |
| Tetramethyl thiuram disulfide | .05 |

One portion of this stock was used as a blank and and another portion was treated with 1% of the thioether of tertiary amyl zinc phenolate described in Example 2 above. A third portion of the stock was treated with 1% of phenyl beta naphthylamine. The tensile strengths of the three samples at optimum cure before and after aging for 72 hours in a Bierer-Davis bomb were determined, with the following results:

| Antioxidant | Tensile strength (lbs./sq. in.) | | |
|---|---|---|---|
| | Unaged | Aged | Percent loss |
| Blank | 2940 | 2280 | 20.7 |
| Phenyl beta naphthylamine | 3110 | 2710 | 12.8 |
| Thioether of tertiary amyl zinc phenolate | 3360 | 3280 | 2.4 |

In another test samples prepared as described were flexed in a De Mattia type machine. At the end of a run of 1,600,000 flexures the blank sample and the phenyl beta naphthylamine treated sample were cracked almost all the way through, whereas the thioether treated stock showed no cracking.

These samples were also exposed at a distance of 12 inches to the light of an ultraviolet carbon arc for sixteen hours. At the end of that time the blank and the thioether treated stock showed almost no staining, while the phenyl beta naphthylamine treated stock was stained a very dark brown.

The above results show that the compounds of the present invention are greatly superior to phenyl beta naphthylamine in imparting age-resisting qualities and in producing a stock which avoids staining on exposure to light.

Another series of tests showed further the advantages of the new class of antioxidants under various artificial aging conditions. In these tests a base stock of the following composition was prepared:

| | Parts |
|---|---|
| Smoked sheet rubber | 100.0 |
| Zinc oxide | 5.0 |
| Sulfur | 2.5 |
| Stearic acid | 2.0 |
| Mercaptobenzothiazole | 1.0 |

A blank sample of the above stock and a sample containing two parts of the thioether of tertiary amyl zinc phenolate described in Example 2 were cured fifteen minutes at 145° C. The fifteen minute period produced an overcure of the stocks. It is on an overcured stock, however, that the effect of age resistors is most noticeable. From each vulcanized sheet nine specimens were cut for tensile strength determinations. Three of these specimens were placed in a Bierer-Davis oxygen bomb operating at 70° C. under 300 lbs. of oxygen; three more were placed in a Geer aging oven at 70° C. for a week, and three more were tested without any forced aging. Tensile strength determinations were made on all samples, and averages of the determinations on the three sets of samples are as follows:

| | Blank (lbs./sq. in.) | With antioxidant (lbs./sq. in.) |
|---|---|---|
| Before aging | 1975 | 1400 |
| After 48 hours in bomb | 420 | 1620 |
| After 7 days in oven | 170 | 1460 |
| Per cent loss in tensile (bomb) | 79 | [1] 17 |
| Per cent loss in tensile (oven) | 92 | [1] 4.3 |

[1] Increase.

For the purpose of comparing the value of the antioxidants of the present invention with the corresponding phenol sulfide containing no metal, such as the compounds of the type proposed as antioxidants in U. S. Patent 1,849,489, the following additional tests were made:

A base stock of the following composition was first made up:

| | Parts |
|---|---|
| Smoked sheet rubber | 100.0 |
| Zinc oxide | 5.0 |
| Sulfur | 2.5 |
| Stearic acid | 2.0 |
| Mercaptobenzothiazole | 1.0 |

To separate samples of this stock the thioether of a tertiary amyl phenol, prepared by the method described in French Patent 824,600, and the magnesium and zinc salts of this compound, prepared as in Example 2 above, were added in the proportions shown in the following table. The samples were cured at 138° C. for sixty minutes and the tensile strength of each sample determined before and after aging in the Geer oven at 70° C. for fourteen days. The data obtained are as follows:

| Antioxidant | Tensile strength (lbs./sq. in.) | | |
|---|---|---|---|
| | Unaged | Aged | Per cent loss |
| Thioether of tertiary amyl phenol (1%) | 2840 | 240 | 91 |
| Magnesium salt of the thioether of tertiary amyl phenol (1%) | 2270 | 1660 | 26.8 |
| Magnesium salt of the thioether of tertiary amyl phenol (2%) | 2360 | 1915 | 18.8 |
| Zinc salt of the thioether of tertiary amyl phenol (2%) | 2970 | 2110 | 29.0 |

The results shown by the foregoing tests clearly indicate that the antioxidants of the present invention are remarkably efficient in imparting aging resistant properties to the rubber stock and are free from the objectionable feature of discoloring light colored stocks or light colored surfaces in contact therewith.

Although the age resisting compounds of this invention are useful in white or light colored rubber because of their ability to retard age deterioration without danger of undue discoloration, they may be obviously used also to retard the age deterioration of dark colored rubber compositions, or of compositions consisting of or containing unvulcanized rubber or rubber-like materials, such as gutta-percha, balata, artificial rubber polymers and copolymers, synthetic rubber-like materials such as polymers of butadiene, 2-chlorobutadiene or the reaction products of polysulfides with halogen-containing hydrocarbons, also copolymers of diolefins and unsaturated nitriles, in which the diolefins are present in more than 50% of the mixture and which are copolymerized either dry at 30° to 100° C. or in emulsion at 50° to 60° C., likewise copolymers obtainable from other polymerizable compounds, such as the copolymers of diolefins and styrene and the copolymer of butadiene and acrylonitrile. Copolymers which are obtained by reacting a low molecular weight olefin, preferably an iso-olefin, such as isobutylene, with low molecular weight diolefins, preferably a conjugated diolefin, such as butadiene, isoprene, dimethylbutadiene, etc., may likewise be improved by treatment according to the present invention. The invention is particularly applicable to the prevention of age deterioration and flex-cracking of the copolymers of iso-olefins and diolefins, such, for example, as the copolymers formed by reacting isobutylene and butadiene at temperatures below 0° C. and preferably at temperatures of —50° to —80° C., or even as low as —103° C., in the presence of a suitable metal halide catalyst, such as aluminum chloride dissolved in methyl or ethyl chloride. Any of the rubber-like compounds herein described may or may not be admixed with fillers, pigments, curing agents and the like.

In the claims the term "rubbery organic material" is employed to cover natural rubber as well as the various organic rubber-like materials, many of which are described above, which are used in the place of natural rubber and possess the characteristic properties of rubber, namely, plasticity, elasticity, and high elongation, whether or not admixed with fillers, pigments, or vulcanizing or accelerating agents.

Although it is usual to incorporate the new antioxidants into the body of the rubber or like compound, the age-resisting advantages may also be obtained by dissolving the materials in a suitable solvent, such as petroleum ether, and applying the solution thus formed to the surface of the vulcanized or unvulcanized rubber or similar product.

For the purpose of determining the flex-resisting properties of a copolymer of isobutylene and butadiene, the following test was made. The copolymer was prepared by reacting 20% by weight of butadiene and 80% by weight of isobutylene at a temperature of approximately —97° C. in the presence of ethylene as a diluent and refrigerant, the catalyst used being aluminum chloride dissolved in methyl chloride. The product formed had a molecular weight of 60,000 to 100,000. A base stock containing the copolymer thus formed was prepared having the following composition:

| | Parts |
|---|---|
| Copolymer | 100.0 |
| Reinforcing gas black | 20.0 |
| Semi-reinforcing gas black | 55.0 |
| Zinc oxide | 5.0 |
| Stearic acid | 3.0 |
| Sulfur | 2.0 |
| Tetramethyl thiuram disulfide | 1.0 |

To a portion of this stock was added 0.5% of the magnesium salt of the thioether of tertiary amyl phenol and to another portion 0.5% of the zinc salt of the thioether of tertiary amyl phenol. These salts were prepared as in Example 2 above. The treated stocks thus prepared and a portion of the same stock used as a blank for comparison were each vulcanized in the form of strips for 30 minutes at 155° C. and tested for flex-resistance in a De Mattia type flexometer. After 1,150,000 flexures the blank had begun to crack, but the treated samples showed no change. After 2,300,000 flexures, the blank had cracked completely, whereas the sample containing the magnesium salt showed no cracking, and that containing the zinc salt showed only very slight cracking.

This invention is not limited to the specific embodiments shown herein, all of such being intended solely for illustration, but is limited only by the terms of the following claims.

We claim:

1. The method of improving rubbery organic material which comprises treating the said material with a compound having the formula—

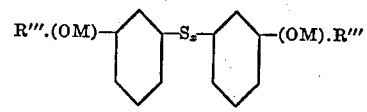

in which the groups R''', OM, and $S_x$ are all connected to the aromatic nucleus, and M represents a metal of group II of the periodic table, R''' represents an alkyl group of four to eight carbon atoms, and $x$ represents an integer, one to four.

2. The method of improving rubbery organic material which comprises mixing therewith a sulfide of a metal alkyl phenolate in which the metal present is a member of group II of the periodic table, in which the alkyl groups contain from four to eight carbon atoms each, and in which the number of sulfur atoms is one to four.

3. The method of improving rubbery organic material which comprises mixing therewith about 0.1% to about 5% by weight of a sulfide of a metal alkyl phenolate in which the metal present is a member of group II of the periodic table, in which the alkyl groups contain from four to eight carbon atoms each, and in which the number of sulfur atoms is one to four.

4. The method of improving rubbery organic material which comprises mixing therewith about 0.1% to about 5% by weight of a zinc salt of a thioether of a tertiary amyl phenol.

5. The method of improving rubbery organic material which comprises mixing therewith a compound of the formula—

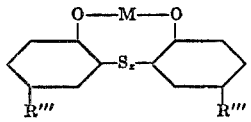

in which M is a metal of group II of the periodic table, R''' is an alkyl group of four to eight carbon atoms, and x is an interger from one to four.

6. The method of improving rubbery organic material which comprises mixing therewith a compound of the formula—

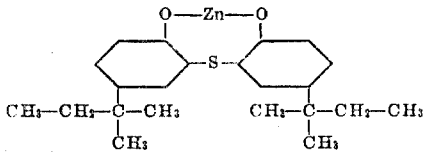

7. An improved product comprising a rubbery organic material in admixture with a relatively small amount of a compound having the formula—

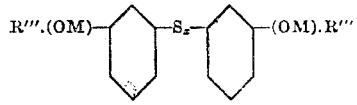

in which the groups R''', OM, and $S_x$ are all connected to the aromatic nucleus, and M represents a metal of group II of the periodic table, R''' represents an alkyl group of four to eight carbon atoms, and x represents an integer, one to four.

8. An improved product comprising a rubbery organic material in admixture with a relatively small amount of a sulfide of a metal alkyl phenolate in which the metal present is a member of group II of the periodic table, in which the alkyl groups contain from four to eight carbon atoms each, and in which the number of sulfur atoms is one to four.

9. An improved product comprising a rubbery organic material in admixture with about 0.1% to about 5% by weight of a sulfide of a metal alkyl phenolate in which the metal present is a member of group II of the periodic table, in which the alkyl groups contain from four to eight carbon atoms each, and in which the number of sulfur atoms is one to four.

10. An improved product comprising a rubbery organic material in admixture with about 0.1% to about 5% by weight of a zinc salt of a thioether of a tertiary amyl phenol.

11. An improved product comprising a rubbery organic material in admixture with a relatively small amount of a compound of the formula—

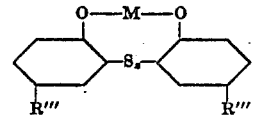

in which M is a metal of group II of the periodic table, R''' is an alkyl group of four to eight carbon atoms, and x is an integer from one to four.

12. An improved product comprising a rubbery organic material in admixture with a relatively small amount of a compound of the formula—

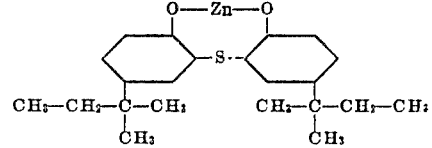

13. An improved vulcanized natural rubber product comprising natural rubber in admixture with a relatively small amount of a sulfide of a metal phenolate, in which the metal present is a member of group II of the periodic table.

14. An improved vulcanized natural rubber product comprising natural rubber in admixture with about 0.1% to about 5% by weight of a zinc salt of a thioether of a tertiary amyl phenol.

15. An improved product comprising a copolymer of isobutylene and butadiene in admixture with a relatively small amount of a sulfide of a metal phenolate, in which the metal present is a member of group II of the periodic table.

16. An improved product comprising a copolymer of isobutylene and butadiene in admixture with about 0.1% to about 5% by weight of a zinc salt of a thioether of a tertiary amyl phenol.

17. The method of improving rubbery organic material which comprises treating said material with a relatively small amount of a metallic salt of a member of the class consisting of alcohols, mercaptans, phenols, and thiophenols, the metal of said salt being a member of groups II to VI of the periodic table.

18. The method of improving rubbery organic material which comprises treating said material with a relatively small amount of a sulfide of a metal alkyl phenolate, the metal of said phenolate being a member of groups II to VI of the periodic table.

19. An improved product comprising a rubbery organic material in admixture with a relatively small amount of a metallic salt of a member of the class consisting of alcohols, mercaptans, phenols and thiophenols, the metal of said salt being a member of groups II to VI of the periodic table.

20. An improved product comprising a rubbery organic material in admixture with a relatively small amount of a sulfide of a metal alkyl phenolate, the metal of said phenolate being a member of groups II to VI of the periodic table.

IRVING E. LIGHTBOWN.
JOHN G. McNAB.